April 5, 1932. D. MARINSKY Re. 18,406
FASTENING DEVICE
Original Filed Jan. 21, 1925
Fig. 1,
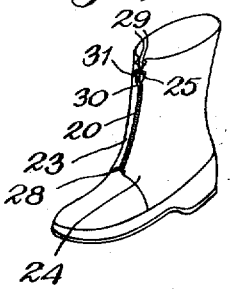
Fig. 2,
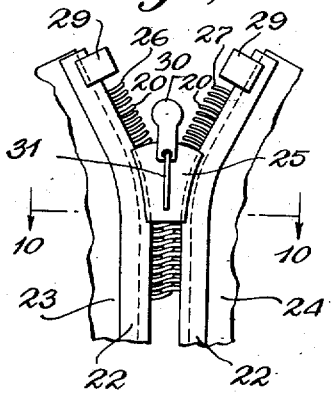
Fig. 3,
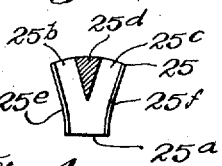
Fig. 4,
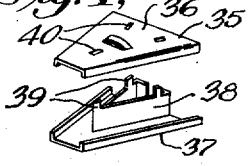
Fig. 5,
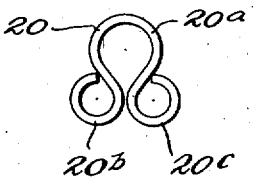
Fig. 8,
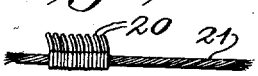
Fig. 8a,
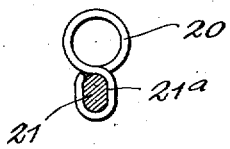
Fig. 9,
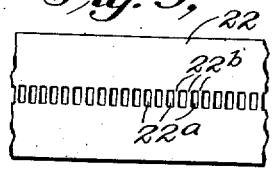
Fig. 6,
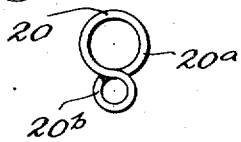
Fig. 11,
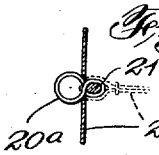
Fig. 10,
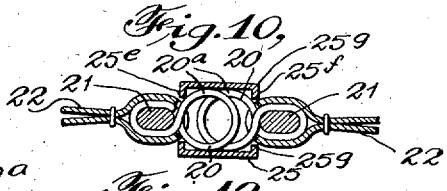
Fig. 7,
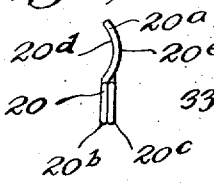
Fig. 12,
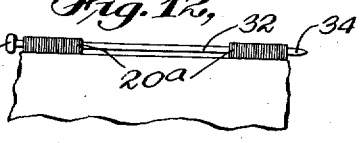
INVENTOR.
DAVIS MARINSKY
BY Howard E. Thompson
ATTORNEY Reissued Apr. 5, 1932 Re. 18,406

UNITED STATES PATENT OFFICE

DAVIS MARINSKY, OF NEW YORK, N. Y.

FASTENING DEVICE

Original application filed January 21, 1925, Serial No. 3,739, Patent No. 1,557,304, dated October 13, 1925. Divided and application filed April 24, 1925, Serial No. 25,639, Patent No. 1,609,487, dated December 7, 1926. Application for reissue filed November 9, 1929. Serial No. 406.122.

This invention relates to fastening devices and particularly to devices of this class adapted to couple and uncouple two or more parts together to retain said parts in locked position against accidental displacement when coupled together; and the object of the invention is to provide a device of the class and for the purpose specified, the separate co-operative members of which are each constructed of a strand of predetermined material upon which are mounted, in juxtaposition, independent catch devices fashioned from rods or wires and said devices being secured to said strand to retain the same in predetermined position thereon; a further object being to provide means for covering or sealing that portion of said devices mounted upon said strand to form a neat and finished appearance to said members and to facilitate the mounting thereof in connection with suitable supports; a further object being to provide means for moving two of said members into interlocked position and to separate said members in coupling and uncoupling two parts or bodies; a still further object being to provide means adapted to be passed through the catch devices of the interlocked members for positively retaining said members against separation; and with these and other objects in view, the invention consists in a device of the class and for the purpose specified, which is simple in construction, efficient in use and which is constructed as hereinafter described and claimed.

The invention described and claimed herein is a division of a co-pending application filed January 21, 1925, and bearing Serial No. 3,739, which has issued in Patent No. 1,557,304, dated October 13, 1925, and is fully disclosed in the following specification, of which the accompanying drawings form a part, in which the separate parts of my improvement are designated by suitable reference characters in each of the views, and in which:—

Fig. 1 is a perspective view of an overshoe illustrating one use of my invention mounted in connection therewith.

Fig. 2 is a detail view of a part of a fastening device made according to my invention.

Fig. 3 is a sectional, detail view of a part of the construction shown in Fig. 2.

Fig. 4 is a perspective detail view of a modified form of device which I may employ.

Fig. 5 is a plan view of an eyelet through which one of the links or catch devices of my invention is formed.

Fig. 6 is a view similar to Fig. 5 showing the link partially formed.

Fig. 7 is a side edge view of the link shown in Fig. 6 and illustrating the final step in completing the formation thereof.

Fig. 8 is a detail view illustrating the manner of mounting the links or catch devices upon a strand or binder.

Fig. 8*a* is a sectional view on an enlarged scale showing the manner of securing the links against displacement on the strand or binder.

Fig. 9 is a detail view of a part of a casing and attaching strip which I employ.

Fig. 10 is a partial section on the line 10—10 of Fig. 2 on an enlarged scale.

Fig. 11 is a diagrammatic sectional view illustrating the method of applying the casing or attaching strip; and, Fig. 12 is a diagrammatic view illustrating a modified use of the invention showing means for positively retaining the device against separation.

My invention relates to fastening devices as are in common use in securing two or more parts or bodies together to retain the same against accidental displacement, as for example, securing the flaps or wings of a shoe or overshoe together, forming a closure for a tobacco pouch or other container, and like uses; but the principal object of my invention is to provide a fastening device of the class specified which may be manufactured at a nominal cost as compared with other devices of this class and yet produce a strong and durable, flexible as well as practical device and which by reason of its construction may be readily manufactured, the distinctive feature of the present invention residing in the construction of the mounting tape or strip and the manner of employing the same in connection with the fastening devices.

In carrying my invention into effect, I employ a plurality of links or catch devices 20, which in the construction shown are preferably in the form of an eyelet, commonly known in the art of fastening devices, said eyelet having a large central loop 20*a* and smaller loops 20*b* and 20*c* disposed at the side portions of the large loop.

In forming my improved fastening device or the separate members thereof, the link 20 is fashioned to bring the loops 20*b* and 20*c* thereof into juxtaposition side by side and in axial alinement, after which or in the same operation, the large loop 20*a* is fashioned to form a concave face 20*d* and convex face 20*e* or into substantially hook formation as clearly seen in Fig. 7 of the drawings, it being understood that said concave and convex faces extend transversely of the link as viewed from one side thereof.

After the links 20 have been formed in the manner above described or produced from a piece of wire fashioned directly into the form shown in Fig. 7 by means of a suitable machine, said links are placed upon a mounting strand or binder 21 which may be a piece of fabric, string, cord and the like or a piece of wire cable or similar flexible and strong and durable material in the manner partially indicated in Fig. 8 of the drawings so that the loops 20*b* and 20*c* of the separate links lie snugly one upon the other, the double loops serving to equally space the links 20 one from the other when mounted upon the strand or mounting 21 as clearly seen in Fig. 8 of the drawings. After the required number of the links 20 have been mounted on the strand 21, the loop portions 20*b* and 20*c* thereof are compressed laterally to securely retain the links against shifting upon the strand 21 and to key said links against rotation, it being seen on a consideration of Fig. 8*a* of the drawings that the strand 21 is compressed as shown at 21*a* in the above operation, and the loops 20*b* and 20*c* flattened to form elongated loops, the openings of which are similar in form to the cross section of said strand.

I also employ a casing or finishing strip 22 which may be composed of any desired material but preferably a fibrous material, and this casing or strip is provided centrally and longitudinally thereof with spaced apertures 22*a* of such dimensions as to receive and frictionally pass over the loops 20*a* of the links 20, and said apertures are divided by transverse members 22*b* which are adapted to be positioned between the separate loops 20*a* when the casing or strip is mounted upon the strand 21 with the links 20 thereon.

In Fig. 11 of the drawings, I have indicated the manner of passing the loops 20*a* through the strip 22 and in dotted lines, I have shown the strip 22 folded around the strand 21 and the loops 20*b* and 20*c* thereon to enclose the bound ends of the links and to form a casing or finishing strip therefor. The strip 22 is also preferably used in securing the separate fastening devices made in the manner set out to predetermined articles or devices such for example as the flaps or wings 23 and 24 of an overshoe or similar article as seen in Fig. 1 of the drawings and also indicated in Fig. 2 of the drawings.

It will be understood that after the separate parts of one fastening device have been made as above described and of a required length and with links of the required size or dimensions, the separate parts of the fastening device are coupled together by a coupling block 25 substantially V-shaped in form in plan, and as shown in Figs. 2, 3 and 10 of the drawings is fashioned from a single metallic body open at one end as shown at 25*a* in the form of a single passage and the opposite end portion of which is divided into separate passages 25*b* and 25*c* by a V-shaped partition wall 25*d* while the sides of the body are also provided with apertures 25*e* and 25*f* opening through the opposite ends of the body and outwardly through said sides and into the passages thereof. The apertures 25*e* and 25*f* are formed by inwardly directed flanges 25*g* at the opposite sides of said block as clearly seen in Fig. 10 of the drawings.

In Fig. 2 of the drawings, I have indicated at 26 and 27 two independent parts of a fastening device, said parts including the strips 22 and binders 21 being joined or coupled together at one end, the end 28 indicated in Fig. 1 of the drawings in the usual or any desired manner, while the other end portions are free and adapted to be moved toward and from each other in the operation of my fastening device, the last named end portions having stop members 29 to limit the movement of the coupling block 25 and to prevent the displacement of said block from the separate members 26 and 27. The pointed end portion of the block 25 or the end portion provided with the aperture 25*a* is directed toward the attached end of the members 26 and 27 and said block is mounted upon and adapted to move longitudinally of said members to couple and uncouple the same in the operation of opening and closing the flaps 23 and 24 of an overshoe or in coupling and uncoupling any two bodies by the use of my improved fastening device. In the above operation of sliding the block 25 longitudinally of the members 26 and 27, the member 26 passes through the aperture 25*b* of said block while the member 27 passes through the aperture 25*c* thereof and said members are brought together and the links 20 thereof interlock in the manner shown in Figs. 2 and 10 of the drawings as they pass through the aperture 25*a* of said block, this result being accomplished in the upward movement of the block while in the downward movement thereof, the V-shaped partition wall 25*d* as well as the apertures 25*b* and 25*c* operate to separate the links one from the other in separating the members 26 and 27.

It will be seen on a consideration of Figs. 2 and 3 of the drawings that the links 20 of the separate members 26 and 27 interlock with the other in a substantial degree and the curved portions of the loops 20*a* thereof interlock with each other to prevent the separation of said links when subject to lateral stress or in other words, the concave faces of oppositely disposed links rest one within the other to form an interlocking construction or a substantially hook-shaped lock. By reason of the fact that the outer end portion of the links 20 of one of the members 26—27 interlocks with the corresponding end portion of the links 20 of the other of said members, said links are also retained against transverse displacement or side movement one upon the other when said links are coupled together. It will also be noted that the flanges 25*g* cooperate with the loops 20*a* of the links in the coupling and uncoupling of the members 26 and 27. The coupling block 25 is also preferably provided with a finger piece 30 movably disposed on said block or a member 31 thereon to facilitate the manipulation of said lock. It will be understood that the strips 22 are stitched or otherwise secured to the flaps 23 and 24 or to the other bodies or parts in connection with which the members 26 and 27 are employed.

In Fig. 12 of the drawings, I have diagrammatically illustrated a modified use of the invention in which a locked rod 32 is used in connection with the members 26 and 27 and is adapted to be passed through the loops 20*a* of both of said members for positively locking the same against forcible displacement or separation, the rod being headed at one end as shown at 33 and provided with an aperture 34 at the other end to facilitate the placement of a seal, lock or the like on the last named end portion to prevent the rod from being accidentally or otherwise removed from the members 26 and 27. It will be understood that the members 26 and 27 have not been shown completely in Fig. 12 as said figure is only diagrammatically illustrative, and this particular use of the invention might be applicable to many articles or containers, such for example as mail bags.

In Fig. 4 of the drawings, I have shown the separate parts of a modified form of coupling block 35 which is of the same general shape and form as the block 25 heretofore described but which is composed of sheet metal having top and bottom plates 36 and 37 of similar form and construction and an intermediate partition wall plate 38 V-shaped in form and having upwardly and downwardly directed prongs 39 adapted to enter apertures 40 in the plates 36 and 37 for securing the parts 36, 37 and 38 together. Only one side of the prongs 39 is shown and the apertures 40 in the plate 36 only is shown, the plate 38 being shown mounted upon and secured to the plate 37 by the prong and aperture construction above described.

It will be understood however, that my invention is not necessarily limited to any specific form of coupling block 25 nor to the specific construction of the attaching or finishing strip constituting a casing for the separate parts of the fastening device, nor am I necessarily limited to the specific shape or form of the separate links employed and particularly the shape or form of the loops 20*a* thereof, and various other changes in and modifications of the construction herein shown and described may be made within the scope of the appended claims without departing from the spirit of my invention or sacrificing its advantages.

It will also be understood that in making fastening devices of the class under consideration, a coating or plating may be readily applied to the links to give a color thereto which will be in harmony with the article in connection with which the device is used; such for example, as a coating of paint or enamel or similar liquid, or a nickel, silver or gold or platinum plating, or plating of any other metal, which result can readily be accomplished in using a metallic strand, and this is one of the distinctive features of my invention.

Having fully described my invention, what I claim as new and desire to secure by Letters Patent, is:—

1. In a fastening device of the class described employing interlocking members, a flexible strand extending through said members, the parts of the members on said strand being in abutting relation, attaching strips of unitary construction apertured to receive parts of said members and the parts of said strips intermediate the apertures engaging parts of said members on said strand in mounting the device in connection with a suitable support, and the apertures on said strips being arranged substantially centrally and longitudinally thereof forming integral side portions foldable around parts of said interlocking member and one upon the other to form a pocket into which the support is placed.

2. In a fastening device of the class described employing interlocking members, flexible strands extending through said members, attaching strips of unitary construction adapted to be folded around said strands, said strips being apertured to receive parts of said members and the parts of said strips intermediate the apertures engaging part of said members on said strands in securing the folded side portions of the attaching strips together.

3. A fastening device of the class described comprising a plurality of loop members mounted in juxtaposition on a mounting strand, an attaching strip adapted to be folded around the strand and loop members thereon, said strip having spaced apertures through which said loop members are adapted to pass, and the portions of the strip intermediate the apertures engaging portions of the loop members on the mounting strand, and the folded side portions of the strip being secured together to retain the same in connection with said loop members and strand.

4. An attaching strip for fastening devices of the class described comprising two interlocking sections and mounting strands extending through said sections, each of said sections having spaced projecting loop members, the parts of the loop members on said strands being in abutting relation and the attaching strip for each section having spaced apertures through which the loop members of each section are adapted to pass and the parts of said strip intermediate the apertures engaging parts of the loop members on said strand and said strip being folded around the strand and the side portions of said strip being stitched together to retain a section in connection with said attaching strip.

5. An attaching strip for fastening devices of the class described comprising two interlocking sections and mounting strands extending through said sections, each of said sections having spaced projecting loop members, the parts of the loop members on said strands being in abutting relation and the attaching strip for each section having spaced apertures through which the loop members of each section are adapted to pass and the parts of said strip intermediate the apertures engaging parts of the loop members on said strand and said strip being folded around the strand and the side portions of said strip being stitched together to retain a section in connection with said attaching strip, and the projecting side portions of said strip forming attaching means for securing the device to a suitable support.

6. In a fastening device of the class described comprising a plurality of loop members, a mounting strand, said loop members having looped portions encircling and secured to said strand, and the loop members being arranged in juxtaposition on the strand, and an attaching strip having spaced apertures through which the loop members are adapted to pass and that portion of the strip intermediate the apertures engaging the loop portions of said members on the strand, said strip being foldable around the strand and the side portions thereof stitched together to retain the strip in connection with the loops and strand.

7. A separable fastener comprising a pair of devices each including a flexible cord having locking members secured thereto and a tape folded around to enclose the cord, the fold of the tape having apertures and intermediate connecting portions, parts of said locking members projecting through the apertures of the tape toward the opposite device, and the connecting portions engaging parts of the locking members on said cord, means connecting said devices adjacent one end of the fastener, and a slide movable along said device to progressively engage and disengage said locking members.

8. The method of mounting a series of fastener elements on a stringer, which comprises arranging the series of elements on a cord or the like, said cord extending through said elements, then inserting the series of elements through a corresponding series of apertures in a strip of fabric to bring the parts of said strip intermediate the apertures in engagement with parts of said elements on said cord, then folding together the portions of the fabric at opposite sides of the series of apertures with the cord in the folded edge thereof, and then securing the side portions of the fabric together to lock said cord in the fold with the fastener elements projecting from the folded edge of the fabric.

9. The method of mounting fastener elements which comprises arranging a plurality of fastener elements in series with an elongated and flexible member extending therethrough, a fabric strip having apertures therein forming intermediate strands with said strands arranged in parallel relation adjacent the series of fastener elements, inserting the fastener elements through the apertures between the strands and the strands between the fastener elements by a relative lateral movement of the series of fastener elements and the series of strands to bring the strands in engagement with the flexible member and with parts of the elements on said member, and then folding the fabric strip along the side thereof.

10. In a fastener structure of the class described, the combination of a strip of fabric having a series of apertures therein, a series of fastener elements, a strand on which said elements are arranged to pass through the apertures of the strip of fabric, portions of the fabric strip at opposite sides of the series of apertures being folded together with the aforesaid cord engaged in the fold and with the parts of the strip intermediate the apertures engaging parts of the fastener elements on said cord, and means for securing the said side portions of the fabric strip together close up to the folded edge so as to lock the cord with the fastener elements thereon in the folded edge.

11. The method of mounting a series of fastener elements on a stringer which comprises running a cord or the like through the series of fastener elements, then inserting a series of fastener elements through a corresponding series of apertures formed in a strip of fabric to position the parts of the strip intermediate the apertures in engagement with parts of said elements on said cord, then folding the strip of fabric around the cord and securing the portions of the fabric at opposite sides of the series of apertures together to lock the cord in the folded edge of the fabric with the fastener elements projecting outwardly from said folded edge.

12. A fastening device of the class described comprising two interengaging and interlocking sections, each of said sections being composed of a plurality of coupling elements adapted to interlock one with the other of the separate sections in coupling said sections together, part at least of each of said elements having deformed outer extremities for interlocking between the opposed elements, a strand of flexible material arranged in the inner portions of the elements of each section, an attaching strip on each of said sections for mounting the same in connection with a suitable support, said strip having apertures spaced longitudinally thereof, and said strip being folded around said strand and the parts of the strip intermediate the apertures engaging parts of the elements thereon.

13. In combination, a fastening device involving spaced coupling loops and a cord extending through said loops and a two-ply fabric strip having threads so interwoven with each of its plies as to form apertures between said threads and said threads extending between the loops and around the cord and engaging parts of the loops on said cord and the plies of the strip being secured together adjacent the threads.

14. In an article of the class described, the combination of an elongated coupling member involving longitudinally spaced coupling loops arranged on a mounting strand, and a strip of fabric having a series of openings therein forming between the openings cross threads, the loops of said member being inserted through said openings, said threads being folded around said strand and engaging parts of the loops thereon and the side portions of said strip being connected together adjacent said strand.

15. A fastener of the class described comprising a stringer consisting of a strip of flexible fabric doubled upon itself with longitudinally spaced openings and connecting parts in the fold and intermediate opposed side portions of said strip, a coupling element involving longitudinally spaced wire loops arranged on a strand and adapted to be threaded through the openings in the fabric strip with the connecting parts engaging the loops on the strand, and a sewed seam permanently uniting the side portions of the folded strip with said coupling element supported in the fold thereof.

In testimony that I claim the foregoing as my invention, I have hereunto signed my name this 7th day of November, 1929.

DAVIS MARINSKY.